United States Patent
Wang et al.

(10) Patent No.: US 12,498,494 B2
(45) Date of Patent: Dec. 16, 2025

(54) TECHNIQUES FOR HIGH-PRECISION LOCATIONING SERVICES IN A MOBILE NETWORK

(71) Applicant: T-Mobile USA, Inc., Bellevue, WA (US)

(72) Inventors: Yu Wang, Fairfax, VA (US); Zheng Fang, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 322 days.

(21) Appl. No.: 18/456,423

(22) Filed: Aug. 25, 2023

(65) Prior Publication Data
US 2025/0067882 A1 Feb. 27, 2025

(51) Int. Cl.
*G01S 19/41* (2010.01)
*G01S 19/42* (2010.01)
*H04W 12/08* (2021.01)
*H04W 64/00* (2009.01)

(52) U.S. Cl.
CPC .............. *G01S 19/41* (2013.01); *G01S 19/42* (2013.01); *H04W 12/08* (2013.01); *H04W 64/003* (2013.01)

(58) Field of Classification Search
CPC ... H04W 88/02; H04W 12/08; H04W 64/003; G01S 5/021; G01S 19/07; G01S 19/40; G01S 19/41; G01S 19/42
See application file for complete search history.

(56) References Cited

U.S. PATENT DOCUMENTS

| | | | |
|---|---|---|---|
| 6,289,279 B1 * | 9/2001 | Ito | G01C 21/206 342/357.34 |
| 2005/0192027 A1 * | 9/2005 | Kim | H04W 64/00 342/357.31 |
| 2010/0304760 A1 * | 12/2010 | Gogic | H04W 64/006 455/456.2 |
| 2013/0076562 A1 * | 3/2013 | Lee | G01S 19/04 342/357.23 |

(Continued)

FOREIGN PATENT DOCUMENTS

| CN | 102419180 A * | 4/2012 | |
|---|---|---|---|
| CN | 104680828 A * | 6/2015 | ............. G08G 1/148 |

(Continued)

*Primary Examiner* — Dung Hong
(74) *Attorney, Agent, or Firm* — Lee & Hayes, P.C.

(57) ABSTRACT

Techniques are described herein for enabling the generation of high-precision location data on a user device using a cellular network infrastructure. In embodiments, such techniques may comprise maintaining, by a base station operating within a cellular network, high-precision location information representing geographical coordinates associated with the base station. The techniques may further involve obtaining, by the base station, current location information associated with the base station and determining a current correction value that represents a difference between the high-precision location information and the current location information. The techniques may further involve determining one or more user devices in communication with the base station, and providing the current correction value to the one or more user devices.

20 Claims, 7 Drawing Sheets

(56) References Cited

U.S. PATENT DOCUMENTS

| | | | |
|---|---|---|---|
| 2013/0310075 A1* | 11/2013 | Lim | H04W 4/025 |
| | | | 455/456.2 |
| 2014/0064126 A1* | 3/2014 | Lim | H04W 64/00 |
| | | | 370/252 |
| 2018/0246220 A1* | 8/2018 | Zhang | G01S 19/04 |

FOREIGN PATENT DOCUMENTS

| | | | | |
|---|---|---|---|---|
| CN | 106686042 A | * | 5/2017 | H04W 64/003 |
| CN | 104159271 B | * | 7/2018 | |
| CN | 110177333 A | * | 8/2019 | H04W 4/33 |
| CN | 113891409 A | * | 1/2022 | H04W 36/0085 |
| KR | 20150107056 A | * | 9/2015 | G01S 5/021 |
| WO | WO-2011155806 A2 | * | 12/2011 | G01S 19/073 |
| WO | WO-2012011690 A2 | * | 1/2012 | G01S 5/02524 |

* cited by examiner

TECHNIQUES FOR HIGH-PRECISION LOCATIONING SERVICES IN A MOBILE NETWORK

BACKGROUND

Cellular networks have evolved greatly over recent years. One of the most recent changes in cellular networks is the adoption of the fifth-generation (5G) technology standard for broadband cellular networks. The adoption of the 5G technology standard by cellular networks has enabled the implementation of new applications/services on a wide variety of electronic devices.

Some applications implemented on an electronic device (e.g., drone navigation/delivery, vehicle self-driving, precision agriculture, asset tracking, etc.) require high-precision location information for the electronic device in order to operate effectively. Such precision may be at the level of submeters, and in some cases even centimeters. Existing cellular network-based location services, such as Cell ID, or enhanced Cell ID, or OTDOA (Observed Time Difference Of Arrival) can provide accuracy only up to level of meters, thus fail to support these applications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

This disclosure describes techniques that may be performed to enable the generation of high-precision location information on user devices using a cellular network infrastructure. Such user devices may be operated either within or outside of the cellular network. In embodiments, the techniques may involve providing correction values to the user devices, such that those user devices are able to generate high-precision location data by adjusting current location data based on the correction value.

In embodiments of the techniques, a number of bases stations operating on a cellular network may each be provided with a high-precision location for that respective base station that is stored in its memory. For example, the base station may be provided with location information collected via a Global navigation satellite system (GNSS). In operation, the base station obtains current location information (e.g., low-precision location information) from one or more components included in the hardware of the base station (e.g., a Global Positioning System (GPS) device). The base station then compares the obtained current location information to the stored high-precision location for that respective base station in order to generate a correction value as a difference between the two values. This correction value may then be provided to various user devices in order to enable the generation of high-precision location information.

Embodiments of the disclosure provide for a number of advantages over conventional systems. For example, the implemented system enables any user device operating within or outside of a cellular network to generate high-precision location data. The embodiments leverage the use of base stations within the cellular network that are distributed throughout a geographic region to generate and distribute correction value data. In some embodiments, encrypted correction value data is broadcast to a wide range of electronic devices, such that any of those devices that are authorized to access the correction value data (e.g., in possession of a cryptographic key) are able to access and use that correction value data.

Figure 1:
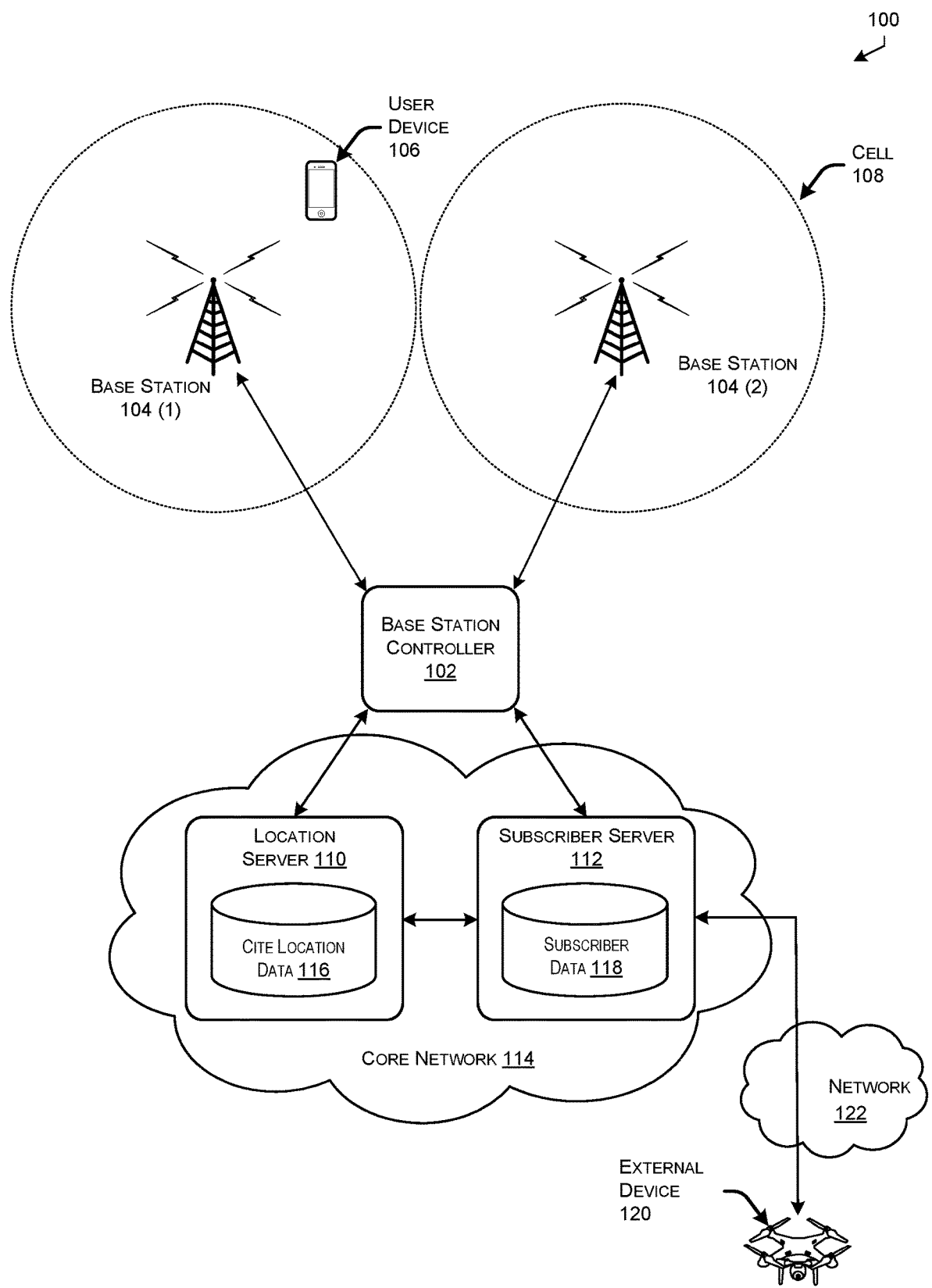
FIG. 1 depicts an example system in which high-precision location data can be determined by user devices in accordance with some embodiments.

FIG. 1 depicts an example system in which high-precision location data can be determined by user devices in accordance with some embodiments. In the system 100 depicted in FIG. 1, a base station controller (BSC) 102 may be in communication with a number of base stations 104 (e.g., base stations 104 (1-2)). Each base stations 104 may include one or more radio access units that provide service (e.g., cellular data service) to a user device 106 within a cell 108 that defines a geographic area. The BSC 102 is in further communication with one or more backend servers, such as a location server 110 and/or a subscriber server 112, via communication over a network 114. The network 114 may include one or more additional electronic devices outside of the system 100.

A base station 104 may include any suitable type of electronic equipment that includes one or more transmission mechanisms (e.g., a radio transceiver) capable of enabling wireless communication with a number of user devices 106. Such base stations may be distributed over an area in a sufficiently dense manner such that user devices (e.g., mobile communication devices) in communication with the network can communicate with each other or with a terrestrial network. In some embodiments, the base station 104 may include one or more sensors configured to collect information about the base station 104 itself or an environment in which the base station 104 is situated. Additionally, the base station 104 may include one or more mechanical means of adjusting/configuring components of the base station. For example, the base station may include a radio antenna as well as a motorized mechanism for adjusting a position of the radio antenna.

A BSC 102 may include any suitable computing device configured to perform the functions described herein. In embodiments, the BSC 102 manages the radio traffic between neighboring ones of a plurality of base stations 104. Such management of radio traffic may include controlling handoff between sectors and/or base stations as a user device 106 traverses between different cells 108.

A user device 106 may include any suitable electronic device configured to interact with a network 114. Such a network (e.g., a cellular network) in which the system 100 is implemented may provide network services to one or more user devices 106 via a base station 104. In some non-limiting examples, the user device 106 may be a variety of devices including, for example: a mobile phone, a personal data assistant (PDA), or a mobile computer (e.g., a laptop, notebook, notepad, tablet, etc.) having mobile wireless data communication capability.

The backend servers (e.g., location server 110 and/or subscriber server 112) may include any suitable computing device configured to manage operation of a network (e.g., a cellular network) as implemented herein. In some embodiments, the backend servers may further include a Mobile Switching Center (MSC). Among other things, a MSC manages voice calls placed in and out of such a network. For example, the MSC may be configured to route calls to base stations for a particular cell 108 within which a user device 106 is located. In embodiments, the various backend servers may maintain information to be used in accordance with the described techniques. For example, a location server 110 may maintain information related to locations of various base stations 104 operating on a network (e.g., cite location data 116). In a second example, a subscriber server 112 may maintain information related to users/accounts operating on the network (e.g., subscriber data 118).

The network 114 may be the Internet, intranet, extranet, or other suitable local or wide area network capable of communicating information between remote endpoints. For the Internet embodiment, information is transmitted in Internet protocol (IP) packets. It will be understood that information may be transmitted in other suitable packets, including asynchronous transport mode (ATM) and other cells or datagrams.

Each of the base stations 104 (1-2) may be provisioned with a data value that represents high-precision location of that base station. In some cases, this may be done when the base station 104 is first installed and/or configured. The high-precision location may be determined using an electronic device separate from the base station. Throughout operation, the base station 104 may be further configured to determine current positioning data using installed location detection components (e.g., a global positioning system (GPS) device). The base station 104 may then determine a difference between the high-precision location data stored for that base station and the determined current location information to identify a correction value. This correction value can then be provided to other electronic devices in the vicinity of the base station (e.g., within a cell 108 serviced by that base station) in order to improve the accuracy of a location that is determined by that electronic device.

In operation, the system 100 provides communication services to a number of user devices 106 across a number of cells 108. To do this, a base station 104 located in a respective cell 108 may maintain a communication session with each of the user devices 106 located in that cell 108. Each base station 104 may provide an indication of a current correction value to each of the user devices 106 that it services. In embodiments, such an indication may be broadcast to each of the user devices in its vicinity (e.g., using a System Information Broadcast (SIB) system). In some cases, such an indication may be conveyed over a dedicated channel, such as Physical Dedicated Shared Channel (PDSCH). The correction value may be encrypted so that it can only be used by authorized devices. For example, information stored in subscriber data 118 may be used to identify one or more authorized user devices 106. Each of these authorized user devices 106 may be provided a cryptographic key that can be used to access and use the encrypted correction value data.

User devices 106 that receive the correction value may use that correction value to generate high-precision location information for the user device. In order to do this, the user device may initially generate a location using installed location determination component, such as an installed GPS device. A high-precision location is then generated by adjusting the generated location to incorporate the correction value received from a local base station.

In some embodiments, the system 100 may further enable one or more external devices 120 to generate high-precision location information, despite not being in direct communication with base stations 104. Note that such external devices 120 may be in communication with the core network 114 via a second network 122, such as the Internet and/or a local network. In such embodiments, an external device 120 provides an indication of its location to the core network 114. Upon receiving this indication, a subscriber server 112 may determine whether the external device 120 is authorized to receive correction value data. Upon determining that the external device is authorized to use the correction value, the location of the external device 120 is compared to locations of base stations 104 (e.g., cite location data 116) in order to identify a base station 104 that is proximate to the external device 120. Upon identifying a proximate base station, the correction value determined by that base station is then conveyed to the external device 120. The external device 120 can then generate a high-precision location by adjusting the location information generated by that external device based on the received correction value.

Figure 2:
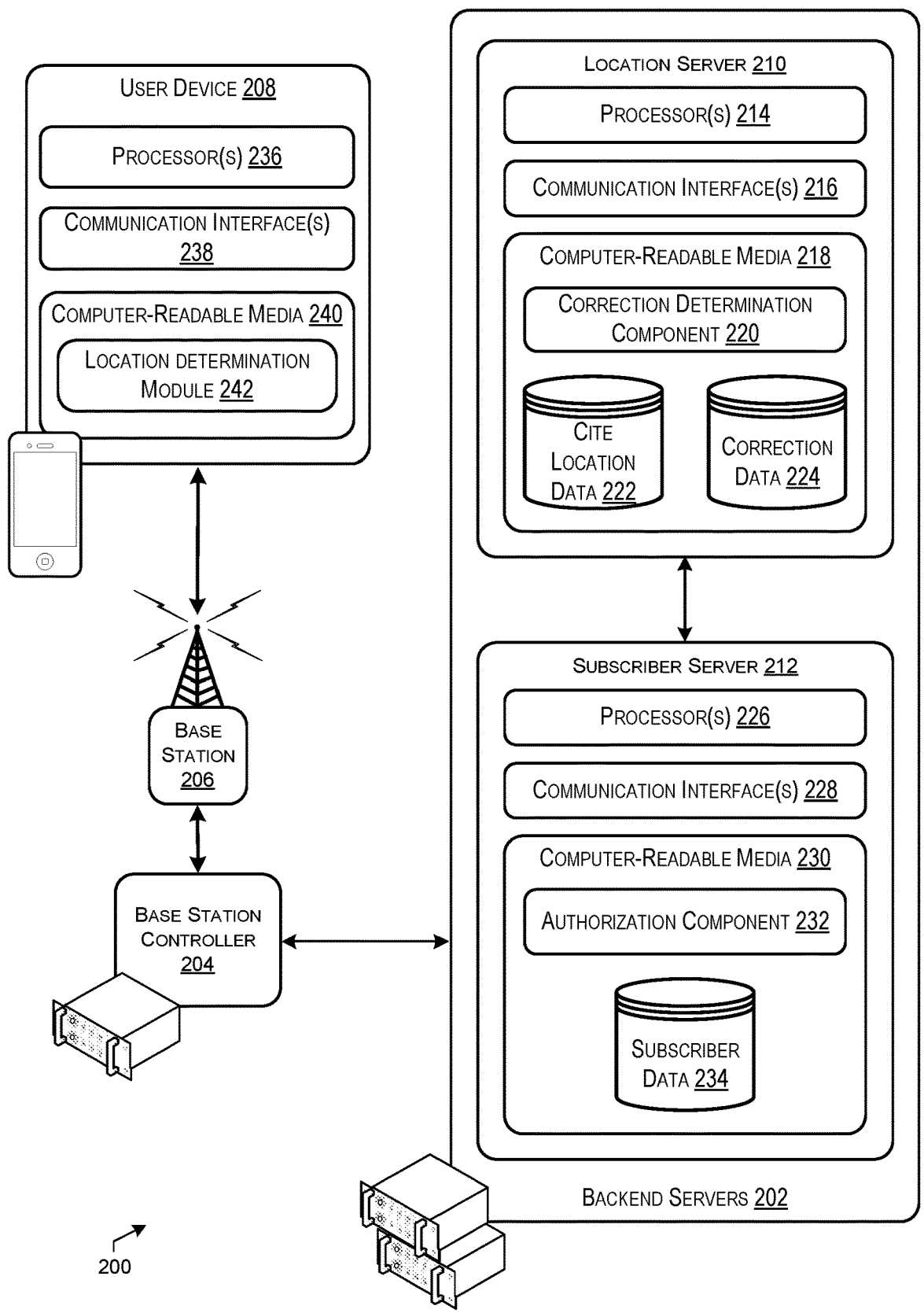
FIG. 2 depicts a component diagram of an example system to be implemented in a network in order to enable high-precision location determination by user devices in accordance with at least some embodiments.

FIG. 2 depicts a component diagram of an example system 200 to be implemented in a network (e.g., a cellular network) in order to enable high-precision location determination by user devices in accordance with at least some embodiments. As depicted in FIG. 2, a number of backend servers 202 may be in communication with a base station controller (BSC) 204 that manages operations of a number of base stations 206. Each base station 206 may further be in communication with a number of user devices 208 operated by various users. Additionally, as described elsewhere, the backend servers 202 may be further in communication with one or more external network.

The backend servers 202 may include a number of different types of servers, each performing various processes as described herein. It should be noted that while certain components/processes may be attributed to a particular server in the description, such components/processes may be implemented on any suitable combination of computing devices. In some cases, each of the described components may be implemented on a single server device. In an exemplary system, the backend servers 202 may include at least a location server 210 and/or a subscriber server 212.

The location server 210 may be any computing device configured to maintain information about locations of base stations operating on a network as well as correction data generated by those base stations. In some embodiments, the location server 210 may be a Real-time Kinematic positioning (RTK) application server.

As illustrated, the location server 210 may include one or more hardware processors 214 configured to execute one or more stored instructions. Such processor(s) 214 may comprise one or more processing cores. Further, the location server 210 may include one or more communication interfaces 216 configured to provide communications between the location server 210 and other devices, such as the base station controller (BSC) 204, a subscriber server 212, or any other suitable electronic device.

The location server 210 may also include computer-readable media 218 that stores various executable components (e.g., software-based components, firmware-based components, etc.). The computer-readable media 218 may store components to implement functionality described herein. While not illustrated, the computer-readable media 218 may store one or more operating systems utilized to control the operation of the one or more devices that comprise the location server 210. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 218 may include portions, or components, that configure the location server 210 to perform various operations described herein. For example, the computer-readable media 218 may include some combination of components configured to implement the described techniques. Particularly, the computer-readable media 218 may include a component configured to determine a correction value to be associated with a base station 206 (e.g., correction determination component 220). Additionally, the computer-readable media 218 may include one or more databases, or other data storage structures, configured to maintain information to be used by the correction determination component 220. By way of example, the computer-readable media 218 may maintain information about locations of base stations (e.g., cite location data 222) as well as information about correction values associated with each base station (e.g., correction data 224).

A correction determination component 220 may be configured to, when executed by the processor(s) 214, determine a correction value to be associated with a base station. In embodiments, such a correction value may be determined as a difference between a current location obtained by a base station 206 (e.g., via an installed GPS system) and a high-precision location associated with that base station. In some cases, the correction value may be represented as a vector or other suitable data value that includes a numeric value and a direction. In some cases, the correction value may be represented by a difference in coordinates (e.g., longitude and latitude values) between the two locations. The determined correction value for a base station may be stored in relation to that base station in the correction data 224. In some cases, correction values may be generated for each of a number of base stations operating on a network on a periodic basis (e.g., every 30 minutes, etc.).

It should be noted that while the correction determination component 220 is depicted as being implemented on the location server 210, such a correction determination component 220 may instead be implemented on another device, such as on the BSC 204 or on each individual base station 206. In these embodiments, rather than determine the correction value associated with each base station at the location server 210, that information is determined at the respective device (204 or 206) and relayed to the location server 210 to be stored in correction data 224.

The subscriber server 212 may be any computing device configured to maintain information about users and/or accounts associated with a network. In some embodiments, subscriber server 212 may be a Networked Transport of RTCM via Internet Protocol (NTRIP) application server and/or a Radio Technical Commission for Maritime Services (RTCM) application server.

As illustrated, the subscriber server 212 may include one or more hardware processors 226 configured to execute one or more stored instructions. Such processor(s) 226 may comprise one or more processing cores. Further, the subscriber server 212 may include one or more communication interfaces 228 configured to provide communications between the subscriber server 212 and other devices, such as the BSC 204, a location server 210, or any other suitable electronic device. Similar to the location server 210, the subscriber server 212 may also include computer-readable media 230.

The computer-readable media 230 may include portions, or components, that configure the subscriber server 212 to perform various operations described herein. For example, the computer-readable media 230 may include some combination of components configured to implement the described techniques. Particularly, the computer-readable media 230 may include a component configured to determine an authorization status for one or more user devices (e.g., authorization component 232). Additionally, the computer-readable media 230 may include a database storing information about users/accounts (e.g., subscriber data 234) to be used in making authorization determinations.

An authorization component 232 may be configured to, when executed by the processor(s) 214, determine an authorization status for each of a number of user devices 208 in communication with a network (e.g., a cellular network) in which the system 200 is implemented. In embodiments, the authorization component 232 is configured to identify one or more user devices operating on a network. In some cases, this may involve receiving information about user devices in communication with one or more base stations 206. In some cases, the subscriber server 212 may receive a request from one or more user devices over a network for authorization to access high-precision location data.

In embodiments, the authorization component 232 is configured to identify a subset of the user devices 208 to be provided with access to correction value data that can be used to generate high-precision location data. This may involve identifying a user and/or an account associated with the respective user device in order to determine a level of access to be associated with that user device. In some cases, this may involve identifying one or more services that are subscribed to by the operator of the user device. For example, the authorization component 232 may make a determination as to whether or not the operator of a user device is subscribed to a service that involves the use of high-precision location data. Upon making a determination that the operator of the user device is subscribed to such a service, the authorization component 232 may identify a cryptographic key to be used to decrypt encrypted correction value data.

In some embodiments, the backend servers 202 are configured to relay correction value data to a user device. In these embodiments, initial location information is received from the respective user device. Such initial location information may include location coordinates for the user device determined using a GPS component included within the user device. Upon receiving the initial location information, the backend servers 202 may determine a base station that is closest in geographic proximity to the user device. The backend servers 202 may then identify a current correction value associated with that base station (e.g., as stored in correction data 224). The identified correction value is then provided to the user device via a communication session with either the base station 206 or over a network connection.

An exemplary user device 208 may be an example of the user device 106 as described in relation to FIG. 1 above. As noted elsewhere, a user device 208 may include any suitable electronic device configured to interact with a network (e.g., via communication with the base station 206). In some cases, the user device 208 may communicate with the other network devices described in relation to FIG. 2 via a communication connection with a base station 206. In other cases, the user device 208 may communicate with the other network devices via a communication connection over a separate network (e.g., the Internet) in communication with the backend servers 202.

Similar to the backend servers 202, the user device 208 may include one or more hardware processors 236 configured to execute one or more stored instructions. Such processor(s) 236 may comprise one or more processing cores. Further, the user device 208 may include one or more communication interfaces 238 configured to provide communications between the user device 208 and other devices, such as a base station 206 or another suitable electronic device.

Similar to the backend servers 202, the user device 208 may include computer-readable media 240 that stores various executable components (e.g., software-based components, firmware-based components, etc.). The computer-readable media 240 may store components to implement functionality described herein.

The computer-readable media 240 may include portions, or components, that configure the user device 208 to perform various operations described herein. For example, the computer-readable media 240 may include some combination of components configured to implement the described techniques. Particularly, the user device 208 may include a component configured to use correction data to determine high-precision location data (e.g., location determination module 242).

A location determination module 242 may be configured to, when executed by the processor(s) 236, generate high-precision location information using correction value data. In some cases, the location determination module 242 may use a cryptographic key provided to it (e.g., by the authorization component 232) to decrypt the correction value received from the backend servers 202. Once the user device has obtained a correction value, the user device may use it to adjust an initial location value captured using a GPS component included in the user device 208. For example, the location determination module 242 may obtain coordinates representing initial location information and update those coordinates based on the correction values, resulting in the generation of high-precision location coordinates. Such high-precision coordinates can then be used by software applications that require high precision location information.

In some embodiments, the location determination module 242 is configured to use the correction value that is received from the backend servers 202. In other embodiments, the location determination module 242 is configured to generate a correction value to be used based on correction values that are determined to be associated with base stations in the vicinity of the user device as a function of the distance of the respective associated base station from the user device. For example, a number of correction values may be received by the user device, each of which is associated with a base station in its vicinity. In this example, a distance (or relative distance) may be determined from the user device to each of the base stations. Each of the number of correction values may be assigned a weight based on the determined distance of the respective base station from the user device. In this example, the correction value may be determined as a function of each of the received correction values and their respective weights.

Figure 3:
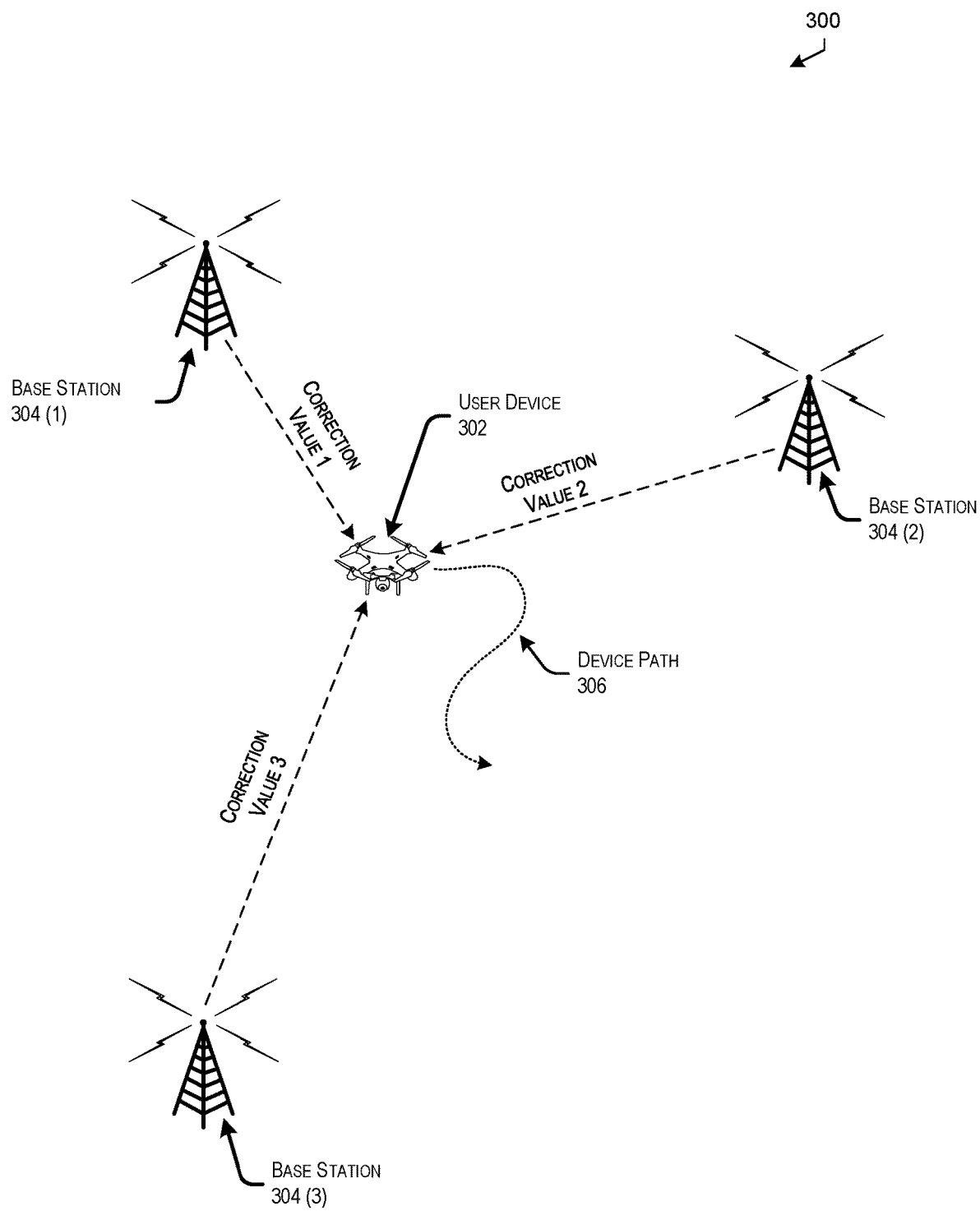
FIG. 3 depicts an illustrative example of techniques for generation and usage of high-precision location information by a user device in accordance with some embodiments.

FIG. 3 depicts an illustrative example of techniques for generation and usage of high-precision location information by a user device in accordance with some embodiments. In the depicted example, a user device 302 may operate within a geographic region that includes a number of base stations 304 (1-3) located throughout that region. As depicted, the user device 302 may be a mobile electronic device capable of traversing a physical space and/or performing actions within that space.

Each of the base stations 304 may be configured to transmit (e.g., via a broadcast message) correction value data. For example, the base station 304 (1) may broadcast a correction value 1, the base station 304 (2) may broadcast a correction value 2, and the base station 304 (3) may broadcast a correction value 3. The broadcast correction values may be received by any suitable electronic device within wireless communication range of the respective base station.

In embodiments, the user device 302 may receive the correction value data broadcast by one or more base stations that are proximate to the user device 302. For example, the user device 302 may receive correction values that are broadcast from each of the base stations within a wireless communication range of the user device 302. In some embodiments, the received correction value data is encrypted. In these embodiments, the user device may decrypt the received correction values using a cryptographic key provided to it via the system.

In operation, the user device 302 obtains initial (e.g., low precision) location information (e.g., geographic coordinates) from a first component (e.g., a GPS component). The user device 302 then adjusts that initial location information based on one or more offsets included in the correction values. In one example, the initial location information may include at least longitude and latitude coordinates. In this example, the correction values may include a longitude offset and a latitude offset. To generate high-precision location information, the user device may add each offset value of the correction value data to the respective coordinate value (e.g., longitude offset to longitude coordinate value and latitude offset to latitude coordinate value) in the initial location information.

In some embodiments, the user device 302 uses only the correction value that is received from the base station 304 closest to it. For example, each correction value broadcast by a base station may also include an indication of the location of the base station. In this example, the user device 302 may estimate a respective distance of itself from each of the base stations 304 in order to identify which of the received correction values should be used. In another example, the user device 302 may use the correction value that is received via the communication session having the strongest wireless communication signal.

In some embodiments, the user device 302 may generate a correction value to be used instead of using a correction value that is received. In some cases, the user device may interpolate, or otherwise extract, a correction value to be used from multiple received correction values. For example, the user device may be configured to generate a correction value as a function of the correction values received from the various base stations in its vicinity. In this example, each of the received correction values may be given a weight based on the respective distance of the user device from the base station associated with that correction value.

By way of illustrating an example of a technique that can be used by a user device 302 to generate a correction value, consider a scenario in which that user device is located between a first and second base station. For the purposes of this scenario, assume that the distance between the first base station and the user device is half of the distance between the second base station and the user device. In this example, the user device receives a first correction value from the first base station and a second correction value from the second base station. The user device, upon determining the relative distances of the base stations from itself, may generate a new correction value to be used as a sum of ⅔ of the first correction value and ⅓ of the second correction value. The user device might then generate high-precision location information using this new correction value.

In some embodiments, the user device 302 may be a vehicle, such as an unmanned aerial vehicle (UAV) or other mobile electronic device. In such embodiments, the user device 302 may be configured to traverse along a device path 306 through a geographic region. It would be recognized by those versed in the art that as the user device 302 traverses along the device path 306, the distance between itself and the base stations in its vicinity will change as the user device 302 traverses the device path 306. Accordingly, the user device may continue to monitor its position relative to various base stations in order to accurately determine a correction value to be used in generating high-precision location data.

Figure 4:
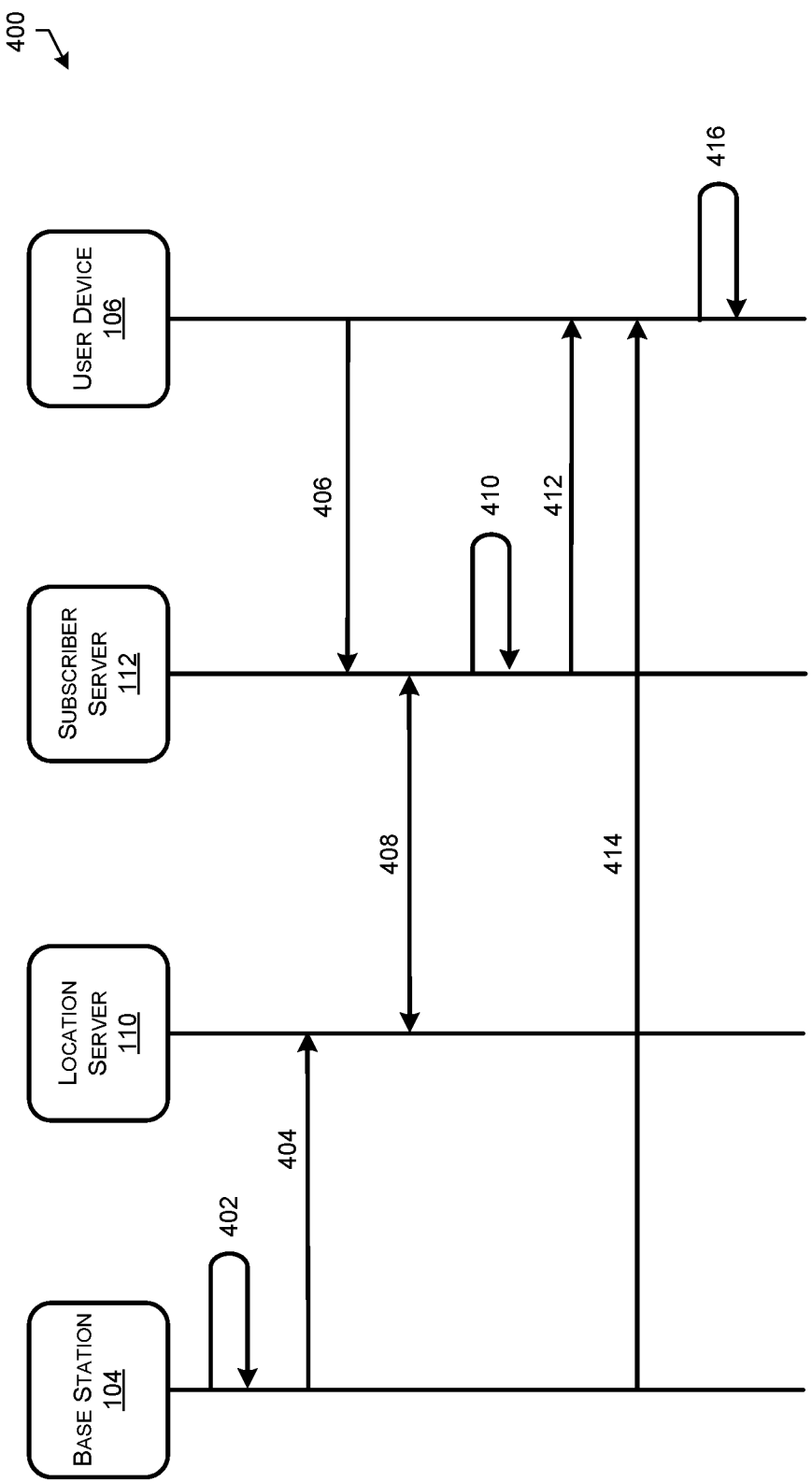
FIG. 4 depicts a swim lane diagram illustrating an example process for generating high-precision location information on a user device operating on a cellular network in accordance with at least some embodiments.

FIG. 4 depicts a swim lane diagram illustrating an example process for generating high-precision location information on a user device operating on a cellular network in accordance with at least some embodiments. The example process 400 may involve interactions between various components, such as a base station 104, a location server 110, a subscriber server 112, and a user device 106 as depicted. The electronic components described in relation to FIG. 4 may be an example of the respective base station 104, location server 110, subscriber server 112, and user device 106 as described in relation to FIG. 1 above.

As noted elsewhere, a base station 104 may be provisioned with high-precision location information. In some embodiments, a separate electronic device that is configured to generate high-precision location information (e.g., a High Accuracy GPS/GNSS Device) may be used to determine a location for the base station. The high-precision location information generated by such a device may be provisioned onto the base station (e.g., to be stored in memory). In some cases, the high-precision information may be provided to the base station when that base station is first installed and/or set up. In these cases, such provisioning may be performed during an onboarding process by a technician that installed the base station. In embodiments, the high-precision location information may be stored within a computer-readable medium of the base station and/or at another computing device (e.g., BSC 102 and/or location server 110).

At 402 of the process 400, the base station may obtain current location data using one or more installed components (e.g., a GPS device). This current location data may be relatively less accurate than the high-precision location information that was previously provisioned onto the base station, as it may involve the use of less precise techniques/hardware. Upon obtaining the current location data, the base station may generate a correction value that represents a difference between that current location data and the high-precision location data stored in memory.

At 404 of the process 400, the base station provides some combination of the current location data and/or the correction value to the location server 110, which then stores that information in a database (e.g., cite location data 222).

At 406 of the process 400, a user device 106 may provide a request to the subscriber server 112 for access to correction value data. In some cases, this may occur when the user device 106 is connected to (e.g., enrolled in) a network, such as a cellular network that includes the base station 104. In some cases, this may occur when a software application (e.g., a mobile application) installed on the user device 106 is executed. For example, a user may execute a software application on the user device that causes it to communicate with the subscriber server 112 over a network (e.g., Internet) connection. In embodiments, this request may include at least an indication of a current location of the user device 106. In these embodiments, the current location may be generated using a component (e.g., a GPS device) installed within the user device 106.

At 408 of the process 400, the subscriber server 112 may retrieve information relevant to user device 106 from the location server 110. In some cases, such information may include information about one or more base stations closest to the user device 106 (as determined based on the location information received from the user device) as well as at least one correction value associated with the one or more base stations. In some cases, the information may include an indication of a cryptographic key that may be used to access (e.g., decrypt) correction value data for the base station closest to the user device.

At 410 of the process 400, the subscriber server 112 may make a determination as to whether the user device 106 is authorized to access correction value data. As noted elsewhere, this may involve determining if a user and/or account associated with the user device is subscribed to a service that authorizes access to the correction value for use in high-precision location determination.

At 412 of the process 400, the subscriber server 112 may provide information to the user device 106 that can be used to generate high-precision location data. In some cases, the subscriber server 112 may provide a cryptographic key to the user device 106 that can be used to decrypt, or otherwise access, secured (e.g., encrypted) correction values. It should be noted that if the user device 106 is not connected to a network (e.g., a cellular network) that includes the base station 104, the subscriber server 112 may provide one or more correction value associated with the base station(s) closest in proximity to the user device 106. If the user device 106 is connected to the network that includes the base station 104, the one or more correction value associated with the base station(s) closest in proximity to the user device 106 may be provided by those base stations directly (as noted at 414 below). Note that the user device 106 may receive correction value data from each of the base stations in transmission range of that user device 106.

At 414 of the process 400, the base station 104 may provide a correction value (as determined at 402) to the user device to be used in generating high-precision location data. In embodiments, the base station may transmit the correction value to multiple user devices in a multicast message (e.g., a broadcast message). In embodiments, the base station may transmit the correction value to a single user device via a dedicated channel. As noted elsewhere, the correction value may be cryptographically secured (e.g., encrypted).

At 416 of the process 400, the user device 106 may use received correction value data to generate high-precision location information. In some cases, the user device 106 may first decrypt the correction value using a cryptographic key received from the subscriber server 112. The user device 106 may receive multiple correction values, each of which are associated with one of multiple base stations that are proximate to the user device 106. In some cases, the user device 106 may select the correction value for use that is associated with the base station closest to the user device 106. In some cases, the user device 106 may generate a new correction value for use from the multiple received correction values. In these cases, the new correction value may be generated as a function of the relative distance of the user device from each of the respective base stations.

In order to generate a high-precision location information, the user device may obtain a current location using an installed component (e.g., a GPS device). The user device may then adjust the current location based on the correction value. For example, the current location may include both latitude and longitude coordinates. In this example, each of the latitude and longitude coordinates of the current location may be adjusted by adding respective latitude and longitude offset values included in the correction value data to generate the high-precision location data.

Figure 5:
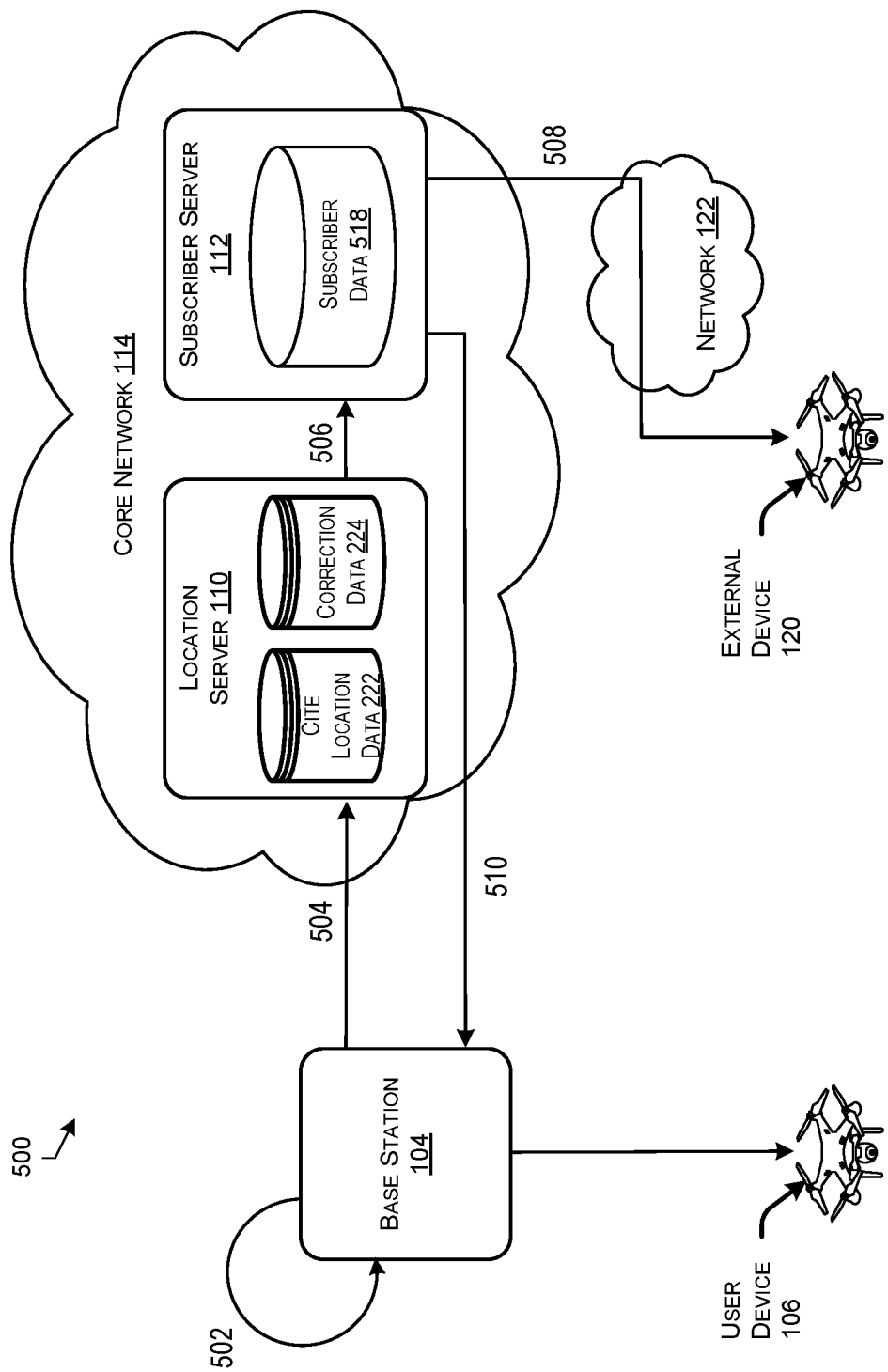
FIG. 5 depicts a process for providing correction value data generated by a network to one or more electronic devices in accordance with some embodiments.

FIG. 5 depicts a process for providing correction value data generated by a network to one or more electronic devices in accordance with some embodiments. The example process 500 may involve interactions between various components, such as a base station 104, a location server 110, a subscriber server 112, a user device 106, and/or an external device 120 as depicted. The electronic components described in relation to FIG. 5 may be an example of the respective base station 104, location server 110, subscriber server 112, user device 106, and external device 120 as described in relation to FIG. 1 above.

At 502 of the process 500, a base station 104 operating within a network is provisioned with high-precision location information. Such high-precision location information may include high-accuracy location data (e.g., GNSS location data) captured using a separate electronic device and provisioned onto the base station. The high-accuracy location data may include an indication of coordinates in latitude and longitude. In some cases, the high-accuracy location data may also include coordinates in altitude. In some embodiments, the high-accuracy location data is provided by the base station 104 to one or more servers operating on the core network 114, such as the location server 110.

At 504 of the process 500, the base station 104 may obtain current location data for the base station that represents real-time measured coordinates of the base station as obtained using hardware components (e.g., a GPS device) installed within the base station. In embodiments, the base station 104 may obtain current location data on a periodic basis (e.g., each 200 ms). In some cases, an interval at which the base station 104 obtains location data on a periodic basis, such an interval may be determined based on configuration settings maintained by the base station.

Upon obtaining current location data, the base station may generate a correction value that represents a difference between the current location data and the high-accuracy location data. The correction value may include a number of offset values. For example, the correction value may include a latitude offset value, a longitude offset value, and/or an altitude offset value. It should be noted that in embodiments in which the base station obtains new current location data on a periodic basis, that base station may also generate current correction value data on that periodic basis. The base station 104 may provide the current location data to a backend server, such as the location server 110, to be stored in cite location data 222 in association with the base station 104. The base station 104 may also provide the current correction value data to the location server 110 to be stored in correction data 224 in association with the base station 104. It should be noted that the location server 110 may be configured to calculate correction value data for each base station based on current location data received from that base station.

At 506 of the process 500, the location server 110 may retrieve and provide one or more correction value and/or current location for a base station to a second server, such as a subscriber server 112. In some cases, such data may be retrieved and provided by the location server 110 in response to a request received from the second server.

In embodiments, a subscriber server 112 may make a determination as to whether one or more user devices is authorized to access correction value data to be used in high-precision location determination. Such a determination may be made based on whether an operator of the user device is associated with a service or authorization level associated with accessing the correction value. The subscriber server 112 may make such a determination upon receiving a request in relation to a user device. In some cases, the request is received from a base station 104 in relation to one or more user devices operating within a cell serviced by that base station. In embodiments, a further determination may be made as to how often new correction value data should be provided to the user device. For example, updated correction value data may be provided to a user device at a higher or lower frequency/interval based on a level of access determined by the subscriber server 112. In some embodiments, upon making a determination that a user device is authorized to access correction data, the subscriber server 112 may be configured to provide a cryptographic key to that user device that can be used to access (e.g., decrypt) that correction value data.

The subscriber server 112 may be further configured to identify at least one base station that is associated with (e.g., in proximity of) a user device. To do this, the subscriber server 112 may receive current location information (e.g., from cite location data 22) for the user device, which is then compared to location information for each of the base stations as stored in cite location data 116 to identify those base stations closest to the user device. Once one or more base stations are identified as being associated with a user device, correction value data for each of those base stations may be retrieved from correction data 224 stored at the location server 110.

As depicted in FIG. 5, the core network 114 may be in communication with one or more external device 120. Such communication may be enabled via a communication connection over a network 122, which might include some combination of one or more types of network, such as a global network (e.g., Internet) and/or local area network (LAN).

At 508 of the process 500, a subscriber server 112 may provide correction value data to an external device 120 with which it is in communication over the network 122. Such correction value data may be provided using any suitable communication scheme/protocol. For example, the subscriber server 112 may use a Radio Technical Commission for Maritime Services (RTCM) protocol to convey the correction value to other electronic devices, such as the external device 120. It should be noted that the subscriber server 112 may send updated correction value data to the external device 120 at periodic updates.

At 510 of the process 500, a subscriber server 112 may provide correction value data to a base station, which may transmit that correction value data to a number of subscriber devices in its vicinity. In some cases, the subscriber server 112 may provide a list of authorized user devices to a base station 104. The base station may then send correction values to each of the authorized user devices 106 on the list via targeted messages (e.g., over a dedicated channel). In other cases, the base station 104 may transmit a broadcast message to any user device 106 in wireless communication range. In these cases, the broadcast message (or at least a portion thereof) may be encrypted, such that the correction value may only be accessed by user devices that contain a cryptographic key that can be used to decrypt the encrypted correction value.

Upon receiving the correction value data, a user device (e.g., user device 106 and/or external device 120) may use that correction value data to generate high-precision location information. As noted elsewhere, this may involve obtaining a current location of the user device from installed hardware (e.g., a GPS device) and adjusting that current location based on the correction value data. To do this, the user device may adjust each of a number of coordinates in the current location by a corresponding offset value included in the correction value. For example, a longitude offset value in the correction value data may be added to a longitude coordinate in the current location in order to generate a high-precision longitude coordinate value. Similar adjustments are made to each of the coordinates in the current location data to generate a high-precision location for the respective user device.

Figure 6:
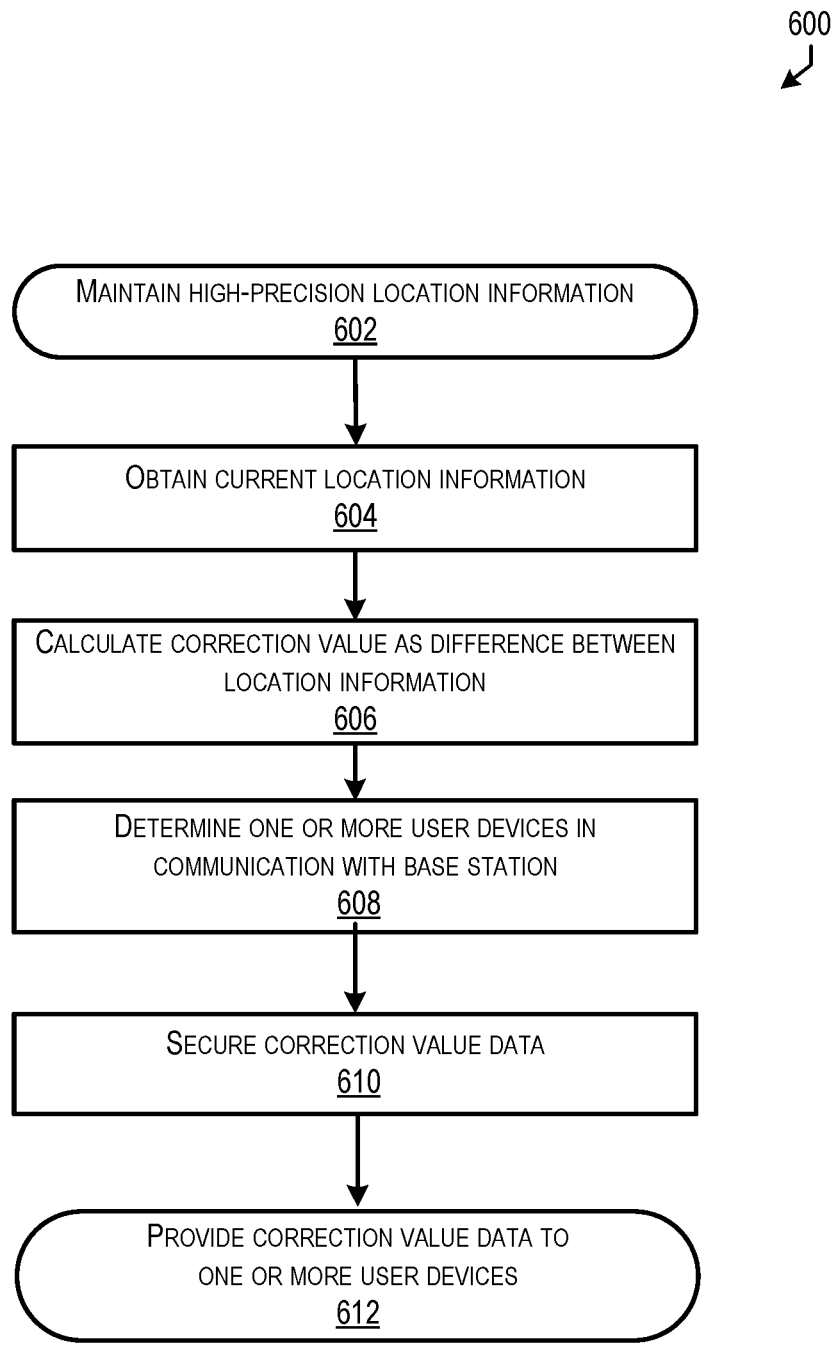
FIG. 6 depicts a flow diagram illustrating an exemplary process for enabling determination of high-precision location data on user devices in accordance with at least some embodiments.

FIG. 6 depicts a flow diagram illustrating an exemplary process for enabling determination of high-precision location data on user devices in accordance with at least some embodiments. The process 600 may be performed by a base station operating within a cellular network, such as the base station 104 as described in relation to FIG. 1 above.

At 602, the process 600 may involve maintaining, at the base station, high-precision location information representing high-accuracy location coordinates associated with the base station. As noted elsewhere, the high-precision location information may be generated by a separate electronic device (e.g., a GNSS receiver device) and provisioned onto the base station.

At 604, the process 600 may involve obtaining current location data for the base station. The current location data for the base station may be obtained using one or more hardware component installed within the base station (e.g., a GPS device). In embodiments, the current location information comprises one or more coordinate values. Such coordinate values may include one or more of longitude coordinates, latitude coordinates, or altitude coordinates.

At 606, the process 600 may involve calculating a correction value as a difference between the high-precision location information and the current location obtained at 604. In embodiments, the current correction value comprises one or more offset values corresponding to one or more coordinate values in the current location information.

At 608, the process 600 may involve determining one or more user devices in communication with the base station. In some embodiments, the one or more user devices are determined based on being within wireless communication range of the base station. In some embodiments, the one or more user devices are determined based on information provided to the base station by a server (e.g., a subscriber server).

At 610, the process 600 may involve securing correction the value data. In some embodiments, this may involve encrypting the correction value using a cryptographic key. It should be noted that any suitable encryption protocol could be used to secure the correction value, including those that use either symmetrical or asymmetrical cryptographic keys.

At 612, the process 600 may involve providing the correction value data to the one or more user devices. In some embodiments, the current correction value is provided to the one or more user devices via a message transmitted over a dedicated channel. For example, the base station may receive an indication of one or more user devices to receive the correction value (e.g., from a backend server) and may transmit the correction value to each of those user devices via dedicated channels hosting communication sessions between the base station and the respective user devices.

In some embodiments, the current correction value is provided to the one or more user devices via a broadcast message. In these embodiments, the correction value may be encrypted so that though it may be received by any electronic device in wireless communication range of the base station, it may only be accessed by authorized used devices (e.g., those that include a cryptographic key).

A user device in communication with the base station may be configured to receive the current correction value from the base station, obtain second current location information associated with the user device, and generate high-precision location information associated with the user device based on the second current location information and the current correction value. In some embodiments, the high-precision location information associated with the user device is generated by adding one or more offset values included in the current correction value to corresponding one or more coordinate values included in the second current location information.

Figure 7:
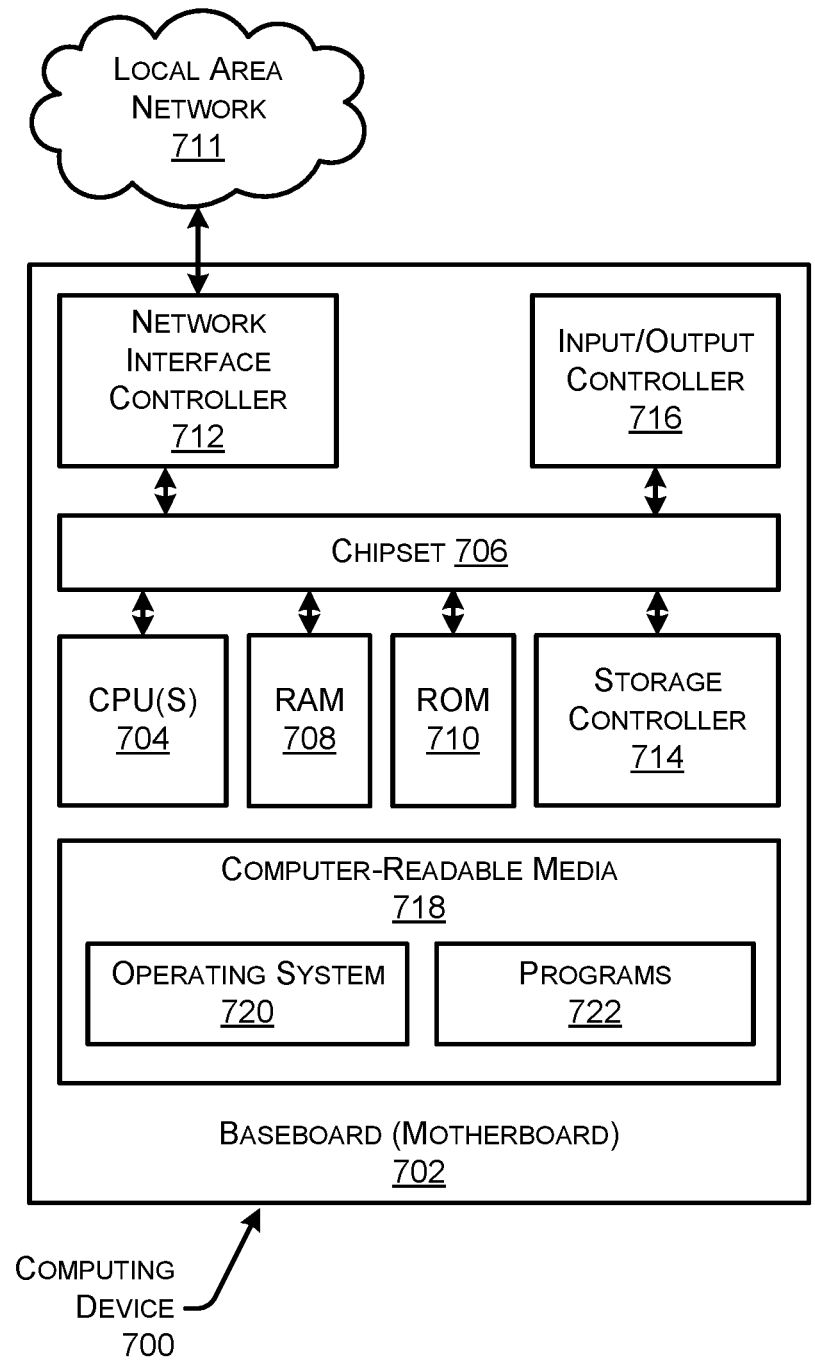
FIG. 7 shows an example computer architecture for a computing device capable of executing program components for implementing the functionality described above.

FIG. 7 shows an example computer architecture for a computing device 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 700 may, in some examples, correspond to a physical server as described herein, and may comprise networked devices such as servers, switches, routers, hubs, bridges, gateways, modems, repeaters, access points, etc.

The computing device 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network 711. The chipset 706 can include functionality for providing network connectivity through a NIC 712, such as a gigabit Ethernet adapter. The NIC 712 is capable of connecting the computing device 700 to other computing devices over the network 711. It should be appreciated that multiple NICs 712 can be present in the computing device 700, connecting the computer to other types of networks and remote computer systems.

The computing device 700 can be connected to a storage device 718 that provides non-volatile storage for the computer. The storage device 718 can store an operating system 720, programs 722, and data, which have been described in greater detail herein. The storage device 718 can be connected to the computing device 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computing device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 718 by detecting the physical states or characteristics of one or more particular locations within the physical storage units.

In addition to the mass storage device 718 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700. In some examples, the operations performed by devices as described herein may be supported by one or more devices similar to computing device 700. Stated otherwise, some or all of the operations performed by an edge device, and/or any components included therein, may be performed by one or more computer device 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computing device 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computing device 700.

In one embodiment, the storage device 718 or other computer-readable storage media is encoded with computer-executable instructions which, when loaded into the computing device 700, transform the computer from a general-purpose computing system into a special-purpose computer capable of implementing the embodiments described herein. These computer-executable instructions transform the computing device 700 by specifying how the CPUs 704 transition between states, as described above. According to one embodiment, the computing device 700 has access to computer-readable storage media storing computer-executable instructions which, when executed by the computing device 700, perform the various processes described above with regard to the other figures. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

As described herein, the computing device 700 may include one or more hardware processors (CPU 704) configured to execute one or more stored instructions. The CPU 704 may comprise one or more cores. Further, the computing device 700 may include one or more network interfaces configured to provide communications between the computing device 700 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 711. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 722 may comprise any type of programs or processes to perform the techniques described in this disclosure. The programs 722 may comprise any type of program that cause the computing device 700 to perform techniques for communicating with other devices using any type of protocol or standard usable for determining connectivity. These software processors and/or services may comprise a scheduler component, as described herein, any of which may alternatively be located within individual base stations.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, programs 722 may also include computer executable instructions that, when executed by processor(s), cause computing device 700 to perform the techniques described herein. To do so, in some embodiments, programs 722 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, programs 722 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    maintaining, by a base station operating within a cellular network, high-precision location information associated with the base station;
    obtaining, by the base station, current location information associated with the base station;
    determining, by the base station, a current correction value that represents a difference between the high-precision location information and the current location information;
    determining, by the base station, one or more user devices in communication with the base station; and
    providing, by the base station, the current correction value to the one or more user devices.

2. The method of claim 1, wherein the current correction value is provided to the one or more user devices via a message transmitted over a dedicated channel.

3. The method of claim 1, wherein the current correction value is provided to the one or more user devices via a broadcast message.

4. The method of claim 3, wherein the current correction value is cryptographically secured to be accessible by a user device of the one or more user devices that includes a cryptographic key.

5. The method of claim 1, wherein the one or more user devices are determined based on being within wireless communication range of the base station.

6. The method of claim 1, wherein the one or more user devices are determined based on information provided to the base station by a subscriber server.

7. The method of claim 1, wherein the high-precision location information is generated using a Global navigation satellite system (GNSS) receiver and provisioned onto the base station.

8. The method of claim 1, wherein the current location information comprises one or more coordinate values and wherein the current correction value comprises one or more offset values corresponding to the one or more coordinate values.

9. A base station computing device comprising:
    one or more processors; and
    one or more non-transitory computer-readable media storing computer-executable instructions that, when executed by the one or more processors, cause the base station computing device to perform operations comprising:
        receiving high-precision location information representing first geographical coordinates associated with the base station computing device;
        obtaining current location information representing second geographical coordinates associated with the base station computing device;
        determining a current correction value that represents a difference between the high-precision location information and the current location information;
        determining one or more user devices in communication with the base station computing device; and
        providing the current correction value to the one or more user devices.

10. The base station computing device of claim 9, wherein the first geographical coordinates comprise one or more of longitude coordinates, latitude coordinates, or altitude coordinates.

11. The base station computing device of claim 9, wherein providing the current correction value to the one or more user devices comprises transmitting the current correction value in a broadcast message to the one or more user devices.

12. The base station computing device of claim 9, wherein the one or more user devices are determined based on information received from a server device.

13. The base station computing device of claim 12, wherein providing the current correction value to the one or more user devices comprises transmitting the current correction value to individual user devices of the one or more user devices over a dedicated channel.

14. The base station computing device of claim 9, wherein the current location information is obtained from a Global Positioning System (GPS) device installed within the base station computing device.

15. A system comprising:
    a base station comprising:
        a first processor and a first non-transitory computer-readable media storing first computer-executable instructions that, when executed by the first processor, cause the base station to at least:
            receive high-precision location information associated with the base station;
            obtain first current location information associated with the base station;
            determine a current correction value as a difference between the high-precision location information and the first current location information; and
            provide the current correction value to a user device; and
    the user device comprising:
        a second processor and a second non-transitory computer-readable media storing second computer-executable instructions that, when executed by the second processor, cause the user device to at least:
            receive the current correction value from the base station;

obtain second current location information associated with the user device; and generate high-precision location information associated with the user device based on the second current location information and the current correction value.

16. The system of claim 15, wherein the high-precision location information associated with the user device is generated by adding one or more offset values included in the current correction value to corresponding one or more coordinate values included in the second current location information.

17. The system of claim 15, wherein the second computer-executable instructions further cause the user device to receive, from a server device, a cryptographic key associated with the current correction value.

18. The system of claim 17, wherein the first computer-executable instructions further cause the base station to encrypt the current correction value, and wherein the second computer-executable instructions further cause the user device to decrypt the current correction value using the cryptographic key.

19. The system of claim 15, wherein the user device comprises a mobile vehicle that is configured to traverse device path.

20. The system of claim 19, wherein at least one second correction value associated with a second base station is provided to the user device as the user device traverses the device path.

* * * * *